United States Patent [19]

Ueda et al.

[11] Patent Number: 5,089,705
[45] Date of Patent: Feb. 18, 1992

[54] INFRARED DETECTOR HAVING DEWAR WITH FILM COATINGS TO SUPPRESS REFLECTIONS

[75] Inventors: Satoshi Ueda; Koji Hirota; Makoto Itoh; Yukihiro Yoshida, all of Yokohama; Hirokazu Hukuda, Kakogawa; Shigeki Hamashima, Yokohama, all of Japan

[73] Assignee: Fujitsu Limited, Kawasaki, Japan

[21] Appl. No.: 654,591

[22] Filed: Feb. 13, 1991

[30] Foreign Application Priority Data

Feb. 16, 1990 [JP] Japan .................... 1-33709
Feb. 21, 1990 [JP] Japan .................... 1-38484

[51] Int. Cl.$^5$ .................... G01J 5/08; G01J 5/04
[52] U.S. Cl. .................... 250/352; 250/338.1; 250/353
[58] Field of Search .................... 250/338.1, 352, 353

[56] References Cited

U.S. PATENT DOCUMENTS

| 4,443,303 | 4/1984 | Freeman ........................ 204/15 |
| 4,795,907 | 1/1989 | Maekawa et al. ............... 250/352 |
| 4,937,450 | 6/1990 | Wakabayashi et al. ......... 250/352 |
| 4,990,782 | 2/1991 | Wellman et al. ............... 250/352 |

FOREIGN PATENT DOCUMENTS

| 61-155926 | 7/1986 | Japan .................... 250/352 |
| 61-233325 | 10/1986 | Japan .................... 250/352 |
| 63-08728 | 8/1988 | Japan .................... 250/352 |

*Primary Examiner*—Constantine Hannaher
*Attorney, Agent, or Firm*—Staas & Halsey

[57] ABSTRACT

An infrared detector is capable of preventing faulty detection attributable to stray infrared rays. The infrared detector comprises an outer cylinder having an inner surface coated with a black film, an inner cylinder having an outer surface coated with a multilayer film capable of suppressing reflection, and an infrared sensing element mounted on the inner cylinder. The combined effect of the black film and the multilayer film prevents the incidence of stray infrared rays, namely, infrared rays scattered by multiple reflection, at the infrared sensing element. The infrared detector can be provided with a plurality of infrared sensing elements to detect infrared rays of frequencies in different frequency bands by providing band-pass filters each having an optical aperture in combination respectively with the infrared sensing elements.

7 Claims, 4 Drawing Sheets

INFRARED DETECTOR HAVING DEWAR WITH FILM COATINGS TO SUPPRESS REFLECTIONS

BACKGROUND OF THE INVENTION

The present invention relates, in general, to an infrared detector and, more particularly, to a cooled infrared detector to be cooled at a low temperature for operation.

An infrared detector or an infrared sensor is used widely in diverse fields for various purposes, such as meteorological survey by an artificial satellite, safeguarding against crimes, preventing disasters, geological survey, resource exploration and medical infrared thermography, for its capability of detecting the presence, shape, temperature, composition and the like of matters without touching the matters. Infrared detectors are classified roughly into thermal infrared detectors, and photoelectric infrared detectors employing semiconductors.

The sensitivity of the thermal infrared detector, in general, is not dependent on wavelength. However, the thermal infrared detector is unsuitable for real-time detection because the sensitivity and response speed of the thermal infrared detector are not high enough for real-time detection. On the other hand, the photoelectric infrared detector has high sensitivity and high response speed, however, the element of the photoelectric infrared detector must be cooled to temperature approximately equal to that of liquid nitrogen. Photoelectric infrared detectors are classified into photoconductive infrared detectors, photovoltaic infrared detectors and MIS infrared detectors. The photoconductive infrared detector detects electromagnetic radiation by the variation of the resistance of a photoconductive element. A known photoconductive infrared detector employs a photoconductive element formed of a compound semiconductor crystal, such as HgCdTe.

Such a photoconductive element is cooled nearly to the temperature of liquid nitrogen to secure high sensitivity by cooling a detecting unit provided with the photoconductive element and contained in a highly heat-insulating vacuum vessel by a refrigerant, such as liquid nitrogen, or by a cryogenic refrigerator.

An example of a conventional infrared detector will be described with reference to FIG. 1. The infrared detector has a vacuum vessel 10 comprising an outer cylinder 14 formed of, for example, an alloyed metal such as that sold under the trademark "Kovar", and an inner cylinder 16 formed of glass and having an outer surface coated with a gold film 15 deposited by evaporation. The space between the outer cylinder 14 and the inner cylinder 16 is evacuated. The outer cylinder 14 and the inner cylinder 16 are mounted on a base 18 formed of Kovar. The base 18 is secured to a support member 20 connected to a helium dilution refrigerator 12. An annular ceramic plate 22 attached to the outer cylinder 14 is connected to lead wires 25 and 27 to transfer a detection signal provided by the infrared sensing element 24 to an external device. An infrared sensing element 24 of a multielement type formed of a compound semiconductor, such as HgCdTe, is attached adhesively to the upper surface of the upper wall of the inner cylinder 16. A germanium window 14a is formed in the upper wall of the outer cylinder 14 to receive infrared rays therethrough. The germanium window 14a serves as a band-pass filter that transmits only infrared rays of frequencies in a predetermined frequency band.

When the helium dilution refrigerator 12 is operated, the infrared sensing element 24 is cooled nearly to the temperature of liquid nitrogen by means of a rod 28 formed of a stainless steel and a heat-conductive spring 28 formed of a copper alloy to detect infrared rays 30 indicated by alternate long and short dash lines.

Another conventional infrared detector similar in construction to that shown in FIG. 1 and having an inner cylinder and an infrared sensing element, which are similar respectively to the inner cylinder 16 and the infrared sensing element 24 of FIG. 1, is provided with a cold shield on the inner cylinder. The cold shield serves as a band-pass filter that transmits only infrared rays of frequencies in a predetermined frequency band.

In the conventional infrared detector shown in FIG. 1, some of the infrared rays 30 transmitted through the germanium window 14a fall on the infrared sensing element 24 after being reflected by the gold film 15 formed over the outer surface of the inner cylinder 16, and the inner surface of the outer cylinder 14 as indicated by arrows Y. The reflected infrared rays, namely, stray infrared rays, are a phantom input signal added to the infrared rays 30 received by the infrared sensing element 24 from the object of detection, namely, signal rays, to cause faulty detection.

Furthermore, the germanium window 14a serving as a band-pass filter transmits only the incident infrared rays of frequencies in a limited frequency band. Therefore, the infrared detector is unable to detect infrared rays of a plurality of different frequency bands even if the infrared detector is provided on its inner cylinder with a plurality of infrared sensing elements respectively having different detecting frequency bands.

Accordingly, a plurality of infrared detectors provided respectively with infrared transmitting windows differing from each other in transmission frequency band must be used for detecting infrared rays in a plurality of different frequency bands.

SUMMARY OF THE INVENTION

Accordingly, it is an object of the present invention to provide an infrared detector capable of achieving correct detection of incident infrared rays by preventing the reflection of infrared rays by the surfaces of the outer and inner cylinders of a heat-insulating vacuum vessel to eliminate stray infrared rays.

Another object of the present invention is to provide an infrared detector capable of detecting infrared rays respectively in different frequency bands.

In one aspect of the present invention, an infrared detector comprises: an outer cylinder provided with an infrared transmitting window and having an inner surface coated with a black film; an inner cylinder disposed within the outer cylinder and having an outer surface coated with an antireflection multilayer film formed by sequentially depositing films respectively having different refractive indices; an infrared sensing element mounted on the inner cylinder; cryogenic cooling means for cooling the infrared sensing element to a low temperature; and signal transfer means for transferring a detection signal provided by the infrared sensing element to an external device.

Preferably, the black film is formed by sintering a material containing carbon and copper oxide as principal components, and the antireflection multilayer film is formed by alternately depositing a silicon dioxide film and a silicon nitride film.

In another aspect of the present invention, an infrared detector comprises: an outer cylinder provided with an infrared transmitting window and having an inner surface coated with an antireflection film; an inner cylinder disposed within the outer cylinder; an infrared sensing element mounted on the inner cylinder; filter means having an optical aperture disposed opposite to the infrared sensing element to transmit only infrared rays in a predetermined frequency band, and provided on the inner cylinder; cryogenic cooling means for cooling the infrared sensing element to a low temperature; and signal transfer means for transferring a detection signal provided by the infrared sensing element to an external device.

The above and other objects, features and advantages of the present invention and the manner of realizing them will become more apparent, and the invention itself will best be understood from a study of the following description and appended claims with reference had to the attached drawings showing some preferred embodiments of the invention.

DESCRIPTION OF THE PREFERRED EMBODIMENTS

Figure 1:
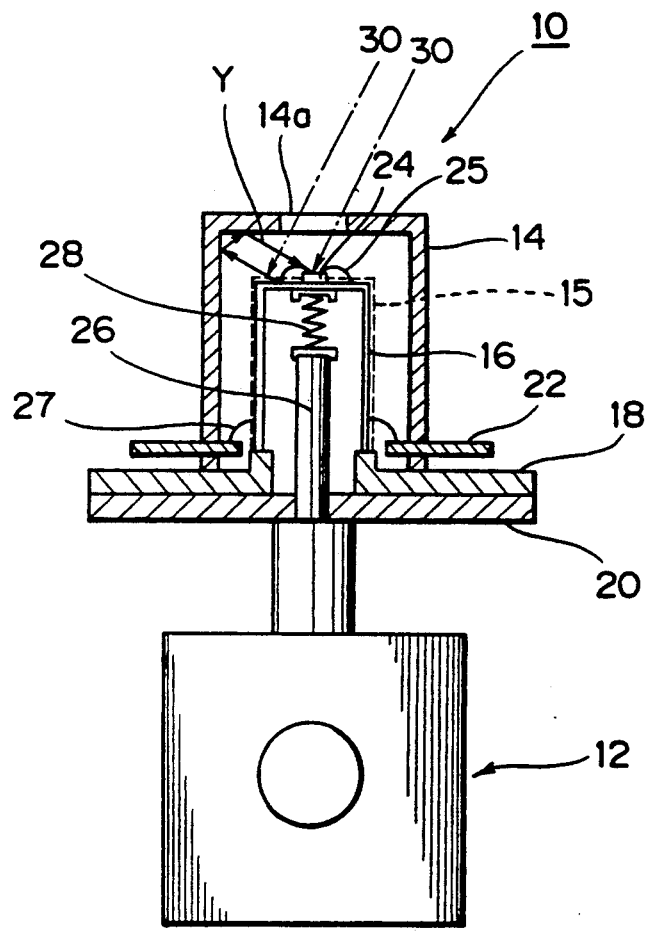
FIG. 1 is a schematic sectional view of a conventional infrared detector.

In the following description of the preferred embodiments of the present invention, parts like or corresponding to those of the conventional infrared detector previously described with reference to FIG. 1 are denoted by the same reference characters and the description thereof omitted to avoid duplication.

Figure 2:
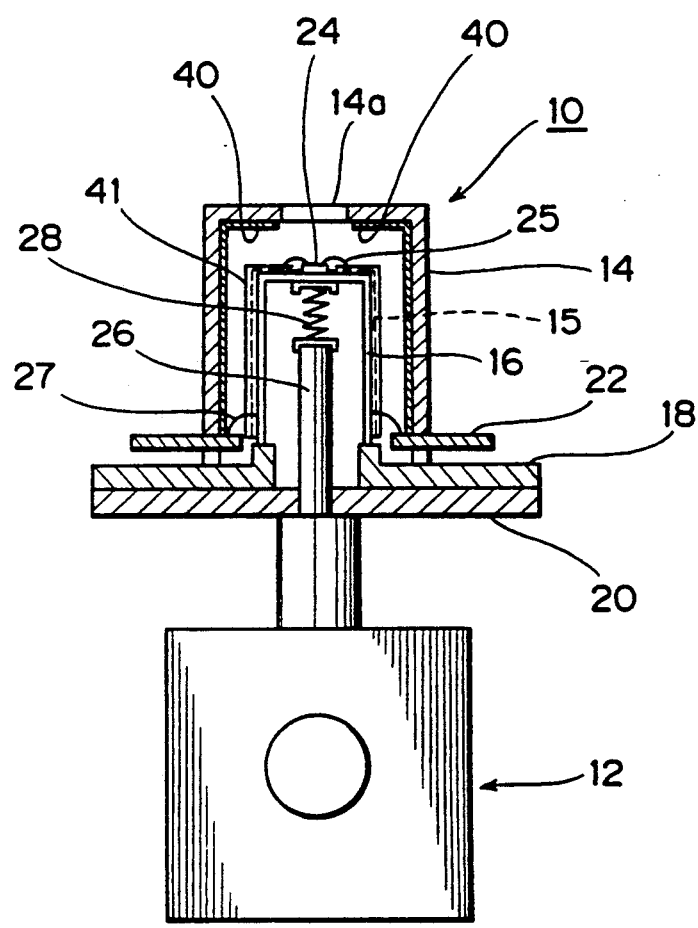
FIG. 2 is a schematic sectional view of an infrared detector in a first embodiment according to the present invention.

Referring to FIG. 2, a vacuum vessel 10 comprises an outer cylinder 14 and an inner cylinder 16. The inner surface of the outer cylinder 14 is coated with a black film 40 to prevent the reflection of infrared rays. The outer surface of the inner cylinder 16 is coated with a gold film 15 formed by evaporation, and the gold film 15 is coated with a multilayer film 41 capable of suppressing the reflection of infrared rays.

The black film 40 is formed in a thickness of about 10 μm by sintering a film of a material containing carbon and copper as principal components at a high temperature exceeding 200° C. The black film 40 is nondirectional with respect to incident light and meets requirements for suppressing the reflection of infrared rays. Accordingly, infrared rays coming into the evacuated space formed between the outer cylinder 14 and the inner cylinder 16 are not reflected by the black film 40 formed over the inner surface of the outer cylinder 14, so that multiple reflection of the infrared rays will not occur and hence stray infrared rays will not fall on the infrared sensing element 24.

Since the black film 40 is formed by sintering the material at a high temperature exceeding 200° C., it is impossible to form the black film 40 over the gold film 15 coating the outer surface of the inner cylinder 16 to which the infrared sensing element 24 capable of withstanding a temperature on the order of 100° C. is attached adhesively. Therefore, the multilayer film 41 which can be formed at a relatively low temperature on the order of 100° C. is formed over the gold film formed over the outer surface of the inner cylinder 16.

The multilayer film 41 is formed by alternately forming a silicon dioxide film and a silicon nitride film, which are different from each other in refractive index, in a thickness in the range of 2 to 3 μm by a plasma vapor deposition process or a vacuum evaporation process. In forming the multilayer film 41 by such a process, the infrared sensing element 24 is coated with a resist film during the deposition of the silicon dioxide film and the silicon nitride film. Since the multilayer film 41 is directional with respect to incident light, namely, since the angle of incidence which will not cause reflection is in a relatively narrow range of 40° to 50° the multilayer film 41 is unable to suppress the multiple reflection of the infrared rays perfectly.

However, since the black film 40 is formed over the inner surface of the outer cylinder 14, and the multilayer film 41 is formed over the gold film 15 formed over the outer surface of the inner cylinder 16, stray infrared rays reflected by the multilayer film 41 are absorbed completely by the black film 40 of the outer cylinder 14, so that any stray infrared rays will not fall on the infrared sensing element 24. Thus, the infrared detector is able to detect infrared rays emitted by an objective matter correctly.

Figure 3:
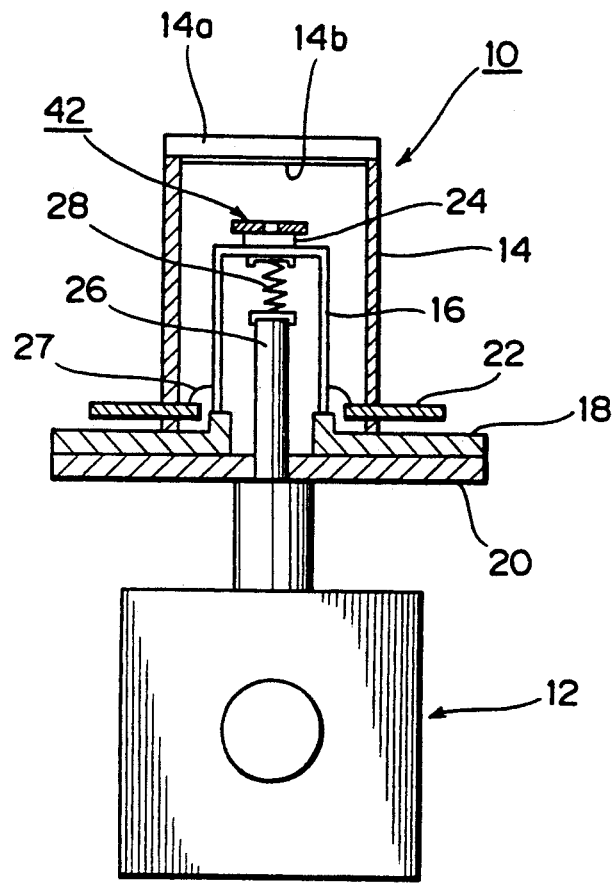
FIG. 3 is a schematic sectional view of an infrared detector in a second embodiment according to the present invention.

Referring to FIG. 3 showing an infrared detector in a second embodiment according to the present invention, the infrared detector employs a germanium window 14a not having the function of a band-pass filter. The inner surface of the window 14a is coated with an antireflection film 14b. A cold filter 42 serving as a band-pass filter is placed on an infrared sensing element 24 mounted on the upper wall of an inner cylinder 16.

Figure 4:
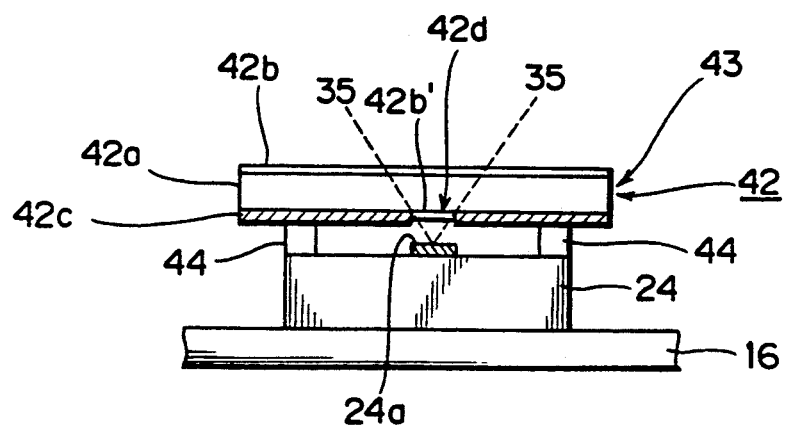
FIG. 4 is an enlarged side view of a cold filter employed in the infrared detector of FIG. 3.

As shown in FIG. 4, the cold filter 42 comprises a band-pass filter 43, and a low-reflectance film 42c formed in a predetermined pattern and defining an optical aperture 42d. The optical aperture 42d is formed opposite to the light receiving portion 24a of the infrared sensing element 24 so as to limit the range of angle of incidence of infrared rays in an angular range indicated by broken lines 35.

The band-pass filter 43 comprises a substrate 42a formed of a material capable of transmitting infrared rays of frequencies in a predetermined frequency band, such as germanium, and multilayer filter films 42b and 42b' formed respectively over the upper and lower surfaces of the substrate 42a. Each of the multilayer filter films 42b and 42b' is formed by sequentially depositing a plurality of films respectively having different refractive indices. For example, the multilayer filter film 42b is a low-pass filter and the multilayer filter film 42b' is a high-pass filter. Thus, a desired band-pass filter is obtained by combining the low-pass filter 42b and the high-pass filter 42b'. The cold filter 42 is spaced apart a predetermined distance from the infrared sensing element 24 by a spacer 44.

Stray infrared rays, namely, infrared rays traveled through the window 14a and reflected by the surface of the inner cylinder 16, are absorbed by the antireflection film 14b and are unable to fall on the infrared sensing element 24, so that faulty detection due to stray infrared rays can be prevented.

The cold filter 42 serving as a band-pass filter, and the low-reflectance film 42c defining the optical aperture 42d limiting the range of angle of incidence of infrared rays limit incident infrared rays only to those of frequencies in a predetermined frequency band. The inner surface of the outer cylinder 14 and the outer surface of the inner cylinder 16, similarly to those of the infrared detector of FIG. 1, may be coated respectively with a black film and a multilayer film for the perfect prevention of stray infrared rays falling on the infrared sensing element 24.

Figure 5:
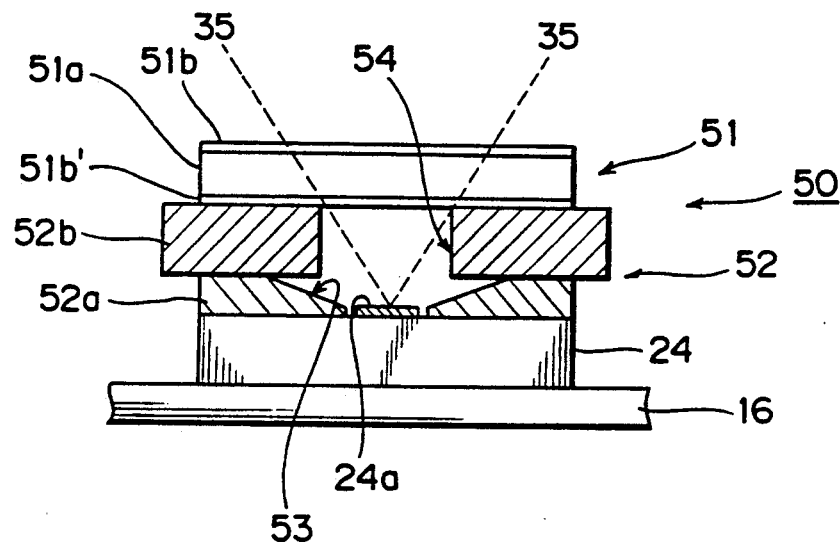
FIG. 5 is an enlarged sectional view of another cold filter.

FIG. 5 shows a cold filter 50 in a modification of the cold filter 42 shown in FIG. 4. The cold filter 50 comprises a band-pass filter 51 and microparts 52.

The band-pass filter 51 comprises a substrate 51a formed of a material that transmits only infrared rays of frequencies in a predetermined frequency band, such as germanium, a high-pass filter films 51b formed over the upper surface of the substrate 51a, and a low-pass filter film 51b' formed over the lower surface of the substrate 51a. Each of the high-pass filter film 51b and the low-pass filter film 51b' is formed by sequentially depositing infrared transmitting films respectively having different refractive indices. The combination of the high-pass filter film 51b and the low-pass filter film 51b' serves as a desired band-pass filter.

The microparts 52 consist of a first ring 52a having an aperture 53, and a second ring 52b having an aperture 54 for limiting the range of angle of incidence to a range indicated by broken lines 35. Each of the first ring 52a and the second ring 52b is formed in a predetermined thickness and a predetermined shape by the anisotropic etching of a silicon chip. The microparts 52 are constructed by adhesively joining together the first ring 52a and the second ring 52b. The microparts 52 are interposed between the infrared sensing element 24 and the band-pass filter 51 as shown in FIG. 3.

Since the microparts 52 are formed of silicon, the distance between the infrared sensing element 24 and the band-pass filter 51 remains fixed regardless of the variation of external conditions including temperature and humidity. Thus, the accuracy of the range of angle of incidence can permanently be secured.

Figure 6:
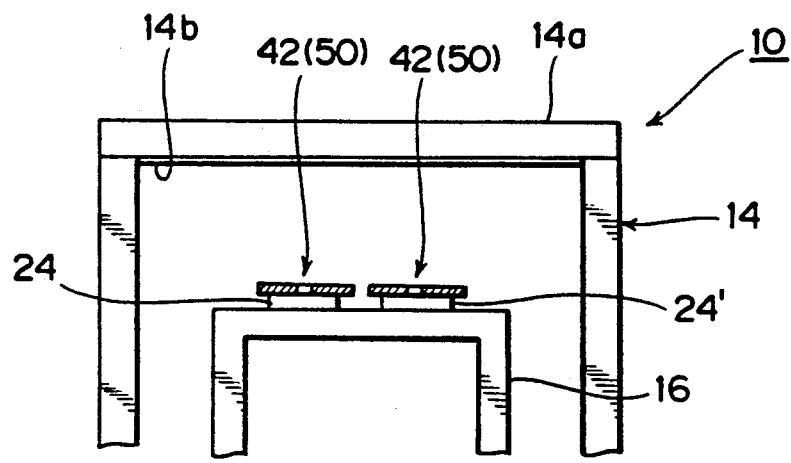
FIG. 6 is a fragmentary side view of an infrared detector in a third embodiment according to the present invention.

FIG. 6 shows an infrared detector in a third embodiment according to the present invention. Infrared sensing elements 24 and 24' differing from each other in detecting frequency band are mounted on an inner cylinder 16. Cold filters similar to either the cold filter 42 shown in FIG. 4 or the cold filter 50 shown in FIG. 5 are provided fixedly on the infrared sensing elements 24 and 24', respectively. The cold filters have band-pass filters which transmit only infrared rays of frequencies in frequency bands corresponding to the detecting frequency bands of the corresponding infrared sensing elements 24 and 24', respectively.

The infrared detector thus constructed is able to detect infrared rays of frequencies in the two different frequency bands by the infrared sensing elements 24 and 24'. The infrared detector may be provided with more than two infrared sensing elements.

What is claimed is:

1. An infrared detector comprising:
   an outer cylinder provided with an infrared transmitting window, and having an inner surface coated with a black film;
   an inner cylinder disposed within said outer cylinder, and having an outer surface coated with an antireflection film formed by sequentially depositing films respectively having different refractive indices;
   an infrared sensing element mounted on said inner cylinder;
   cryogenic cooling means for cooling said infrared sensing element to a low temperature; and
   signal transfer means for transferring a detection signal provided by said infrared sensing element to an external device disposed outside said outer cylinder.

2. An infrared detector according to claim 1, wherein said black film is formed by sintering a material containing carbon and copper oxide as principal components, and said antireflection film is formed by alternately depositing a silicon dioxide and a silicon nitride film.

3. An infrared detector according to claim 1, wherein a plurality of infrared sensing elements are mounted on said inner cylinder, each of said infrared sensing elements having a different detecting frequency band with respect to each other.

4. An infrared detector comprising:
   an outer cylinder provided with an infrared transmitting window having an inner surface coated with an antireflection film;
   an inner cylinder disposed within said outer cylinder;
   an infrared sensing element mounted on said inner cylinder;
   filter means mounted on said inner cylinder for transmitting only infrared rays of frequencies in a predetermined frequency band, said filter means including:
      an optical aperture formed opposite said infrared sensing element;
      a substrate capable of transmitting infrared rays;
      filter films formed respectively over opposite major surfaces of said substrate;
      a low-reflectance film formed over the major surface of said substrate facing said infrared sensing element for defining said optical aperture; and
      spacing means for spacing, by a predetermined distance, said substrate and said infrared sensing element;
   cryogenic cooling means for cooling said infrared sensing element to a low temperature; and
   signal transfer means for transferring a detection signal provided by said infrared sensing element to an external device disposed outside said outer cylinder.

5. An infrared detector according to claim 4, wherein said spacing means is formed by an anisotropic etching of silicon chips and having a central through hole.

6. An infrared detector according to claim 4, wherein a plurality of infrared sensing elements differing from each other in detecting frequency band are mounted on said inner cylinder, and wherein a plurality of filter means respectively capable of transmitting only infrared rays of frequencies in frequency bands respectively corresponding to the detecting frequency bands of said corresponding infrared sensing elements are provided in combination respectively with said infrared sensing elements.

7. An infrared detector according to claim 4, wherein the inner surface of said outer cylinder is coated with a black film of a material containing carbon and copper oxide as principal components, and the outer surface of said inner cylinder is coated with an antireflection film formed by sequentially depositing a plurality of films of different refractive indices.

* * * * *

UNITED STATES PATENT AND TRADEMARK OFFICE
CERTIFICATE OF CORRECTION

PATENT NO. : 5,089,705
DATED      : FEBRUARY 18, 1992
INVENTOR(S) : SATOSHI UEDA ET AL.

It is certified that error appears in the above-identified patent and that said Letters Patent is hereby corrected as shown below:

Title page, item [30]
    line 1, "1-33709" should be --2-33709--;
    line 2, "1-38484" should be --2-38484--.

Col. 4, line 11, "gold film" should be --gold film 15--.

Signed and Sealed this

First Day of June, 1993

Attest:

MICHAEL K. KIRK

Attesting Officer     Acting Commissioner of Patents and Trademarks